Figure 1:
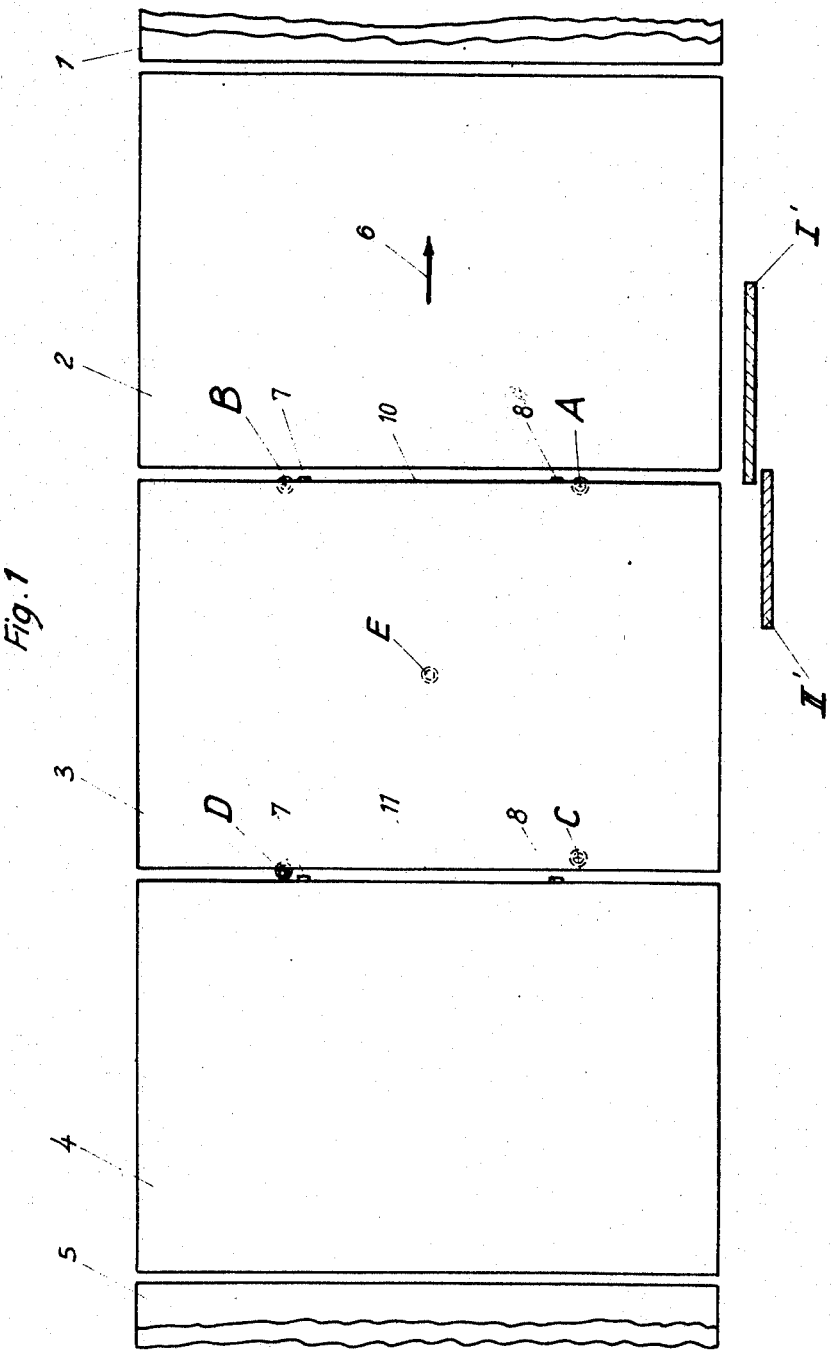

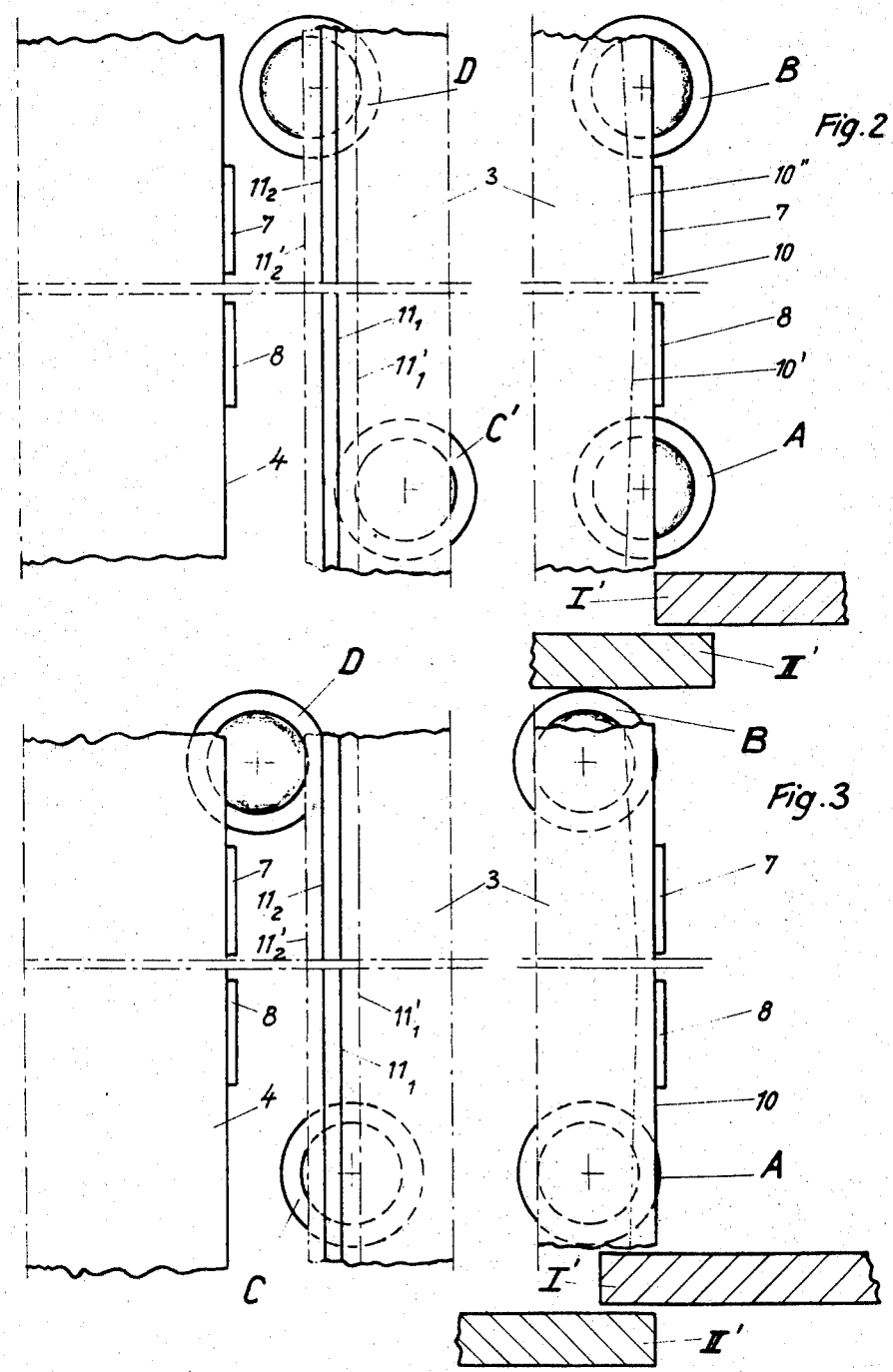

United States Patent Office 3,386,576
Patented June 4, 1968

3,386,576
MACHINE FOR MANUFACTURING SACKS HAVING FOLDED BOTTOMS FROM TRANSVERSELY FED TUBE SECTIONS
Willy Niemeyer, Natrup-Hagen, Karl-Heinz Haneke, Tecklenburg, and Gottfried Espel, Lengerich, Germany, assignors to Windmoller & Holscher, North Rhine-Westphalia, Lengerich, Germany
Filed Feb. 7, 1966, Ser. No. 525,755
Claims priority, application Germany, Feb. 16, 1965, W 38,569
21 Claims. (Cl. 209—82)

This invention relates to a machine for manufacturing sacks having folded bottoms, which sacks are made from transversely fed tube sections, particularly of plastics material. Plastics material tubing is extruded through an annular nozzle and by an internal superatmospheric pressure is expanded as desired and then flattened. By experience, such tubing has a relatively large variation in width owing to the fact that it is difficult to regulate the integral superatmospheric pressure. As the extruded plastics material is set by cooling and the degree of expansion effected by a given internal superatmospheric pressure depends on the degree of setting, the temperature of the plastics material and of the internal and external air constitute significant controlling variables, which can easily result in irregularities, particularly because the result of a regulating action can be checked only on the flattened tubing.

In machines for manufacturing block bottom sacks from transversely fed tube sections made from the plastics material tubing thus described, the rotary spreaders entering the tube sections are designed to reach in succession under the forward and rear triangular pockets, which have been formed by the bottom-laying operation. As a result, these triangular pockets are aligned. The shoes provided for this purpose on the spreaders are adjusted in accordance with the desired width of the tube. In a tube section which is too wide, the spacing between the forward and rearward triangular pockets is excessive so that the spreader shoes cannot reach the diagonal folds of the rear triangular pockets and cannot exert an aligning action. Thus, these inturned corner portions can assume an oblique condition, which leads to unsightly crossed-bottom bags. It is even worse if the tube sections are too narrow so that the aligning tools cannot be accomodated and overstress the diagonal folds of the triangular pockets whereby the material is weakened or even ruptured. Variations in the width of the tube sections result also in block bottoms having different lengths so that they do not match the bottom cover sheets, which have been cut to the desired length.

Attempts to provide machines which are adaptable to the variation of the width of the tube sections to be processed have not led to the desired result or have involved such a high expenditure that they cannot be justified economically. According to the invention, the described difficulties in machines of the type described initially hereinbefore are avoided by the provision of the device which precedes the bottom-laying station and serves for automatically rejecting any tube section which differs from the desired width by more than a predetermined, allowable tolerance, said device consisting of a photoelectrical sensing station and of at least one movable deflector, which is electromagnetically controlled in response to said sensing station and serves for rejecting defective tube sections. As the machine is adjustable to the handling of tube sections having different desired widths, the rejected workpieces are jointly passed through the machine again when the machine has been adjusted, e.g., to wider tubes. The tubes which are then rejected again because they are too narrow are processed in a further operation after the machine has been adjusted to narrower tube sections.

This method of operation is improved by the further proposal to provide two movable deflectors for tube sections which are too wide and too narrow, respectively. In this case it is sufficient to adjust the machine to a different tube width and then to feed the corresponding tube sections into the machine. This reduces the time required for the handling in the machine because off-size workpieces need not be rejected again. Such additional rejection would involve an interruption of work.

A further problem which arises is to compare the width of moving workpieces with a desired width and to generate signals for an appropriate control of the movable deflector or deflectors to reject any workpieces which differ from the desired width. According to the invention, the width of moving workipeces is compared in that one of the longitudinal edges of the tube section, preferably the leading edge of the tube section, is caused to engage stops which move in the feeding direction, and signals indicating the actual passage of the other longitudinal edge of the tube section are compared in the photoelectric sensing station with two signals representing the desired passage times for the two tolerance limits of the respective longitudinal edge of the tube section. According to the invention, photodiodes are preferably used for transmitting the signals indicating the actual passage, and timing cams are used for energizing or de-energizing the photodiodes at the time of the desired passage. The photodiode for detecting tube sections which are too wide may be energized by a timing cam immediately after the desired passage time of the trailing edge of the widest tube section within the tolerance range and may be arranged to transmit a signal when this photodiode is covered. To detect tube sections which are too narrow, a photodiode is used which is de-energized by a timing cam immediately before the desired passage time of the trailing edge of the narrowest tube section within the tolerance range and which transmits a signal when exposed to light.

The tolerance range of the widths of the tube sections which can be processed in the machine lies between the tube sections which are too wide and those which are too narrow. This tolerance range amounts to ±1.5 mm. and must be allowed for in sensing the trailing edges of the closely succeeding tube sections.

That point of the machine where the actual passage time of the trailing edge of the tube is compared to the desired passage time may differ for the sensing of tube sections which are too wide and for tube sections which are too narrow so that, in other words the spacing of the two photodiodes in the feeding direction exceeds the spacing of the tolerance limits and the signals indicating the desired passage times are generated by the two timing cams in succession. A specific desired passage time is associated with each point of the machine. By the selection of the sensing point, the desired passage times of the trailing edges of tube sections which are too wide and tube sections which are too narrow can be coordinated as desired. The tolerance of tube sections of normal width can also be allowed for by an appropriate selection of the sensing points for tube sections which are too wide and tube sections which are too narrow, without adversely affecting the arbitrary coordination of the desired passage times.

According to the invention, the sensing points for tube sections which are too wide and tube sections which are too narrow may be disposed so that, with allowance being made for the tolerance limits, the photodiode for detecting tube sections which are too narrow is de-energized after the photodiode for detecting tube sections which are too wide is energized. This may be achieved by an appropriate displacement of the photodiode for detecting tube sections which are too narrow in the feeding direction of the tube sections relative to the photodiode for detecting tube secions which are too wide. The tolerance for tube sections of normal width, which are not to be rejected, must be allowed for by an appropriate further displacement of the photodiode in the feeding direction. According to the invention, the photodiodes and timing cams may be arranged in such a circuit that both photodiodes are de-energized at the same time by one and the same timing cam. In this case, one and the same switching operation serves also for de-energizing the photodiode for detecting tube sections which are too wide before the next tube section reaches the photodiode. Unless the photodiode were not de-energized at this time, a wrong signal would be generated.

In this case, the timing cam for energizing the photodiode for detecting tube sections which are too wide need not be used for de-energizing this photodiode and serves according to the invention for de-energizing the solenoid for controlling the movable deflector or deflectors approximately after one half of a cycle. It will be particularly advantageous if a thyratron adapted to be fired by the respective photodiode is provided for energizing each deflector solenoid and the switch operated by the timing cam as well as the solenoid or solenoids are included in the anode circuit of the thyratron or of both thyratrons. The switch which is operated by the timing cam which is not required for de-energizing the photodiodes serves for extinguishing the thyratron or thyratrons.

Until the timing cam for energizing the photodiode for detecting tube sections which are too wide has closed the associated switch in the anode circuit, the photodiodes cannot transmit a signal for energizing the solenoid or solenoids for releasing the deflector or deflectors. As has been stated hereinbefore, the timing cam for de-energizing the photodiode for detecting tube sections which are too narrow—this timing cam will hereinafter be referred to as timing cam II—de-energizes also the photodiode for detecting tube sections which are too wide. Hence, the two timing cams define the period of time within which tube sections which are too narrow and tube sections which are too wide must be detected. This period of time is defined by the energization effected by timing cam I and the subsequent de-energization effected by timing cam II and must be so long that the variations to be expected in the tube width and amounting to about ±5 mm., reduced by the above-mentioned, allowable width variations of ±1.5 mm., can be sensed within this time. This means that said period of time must be so long that the tube sections can be advanced in this time by at least 5 mm. minus 1.5 mm.=3.5 mm. In the case of a throughput of 120 tube sections per minute and a distance of 760 mm. between the leading edges of two succeeding tube sections, only 2.3 milliseconds are required for this movement. During this short time the trailing edge of the tube is sensed for the detection of tube sections which are too wide and tube sections which are too narrow.

As has been stated above, the anode circuit of the thyratrons includes a switch, which is operated by timing cam I, and this anode circuit remains closed for about one half of a machine cycle or at least 0.25 second. For this reason, the switch which is operated by timing cam II and serves for a premature de-energization of the photodiode for detecting tube sections which are too narrow as well as for the simultaneous de-energization of the photodiode for detecting tube sections which are too wide, is included according to the invention in the grid circuit of the thyratrons whereas the energization of the anode circuit of said thyratrons is continued when the grid voltage required for closing the anode voltage disappears. This property requires a special de-energization of the anode circuit. This de-energization of the anode circuit is effected by timing cam I. According to the invention, the closing of the switch which is operated by timing cam II may precede the closing of the switch which is operated by timing cam I, but only for such a period of time that the other timing cam has already opened the anode circuit so that there is no interference with the preceding sensing cycle. For this reason, timing cam II may close the switch associated with it almost for one half of a machine cycle period. This is advantageous because large accelerations in the operation of the switches are avoided. As the measuring period must not exceed 13 milliseconds as the spacing between the tube sections is at least 20 millimeters according to the invention the beginning and the end of this very short measuring period are each associated with a timing cam. The measuring period is the overlap period whereas the timing cam can close and open the associated switch within a much longer period of time. As a result, it is not necessary to close one switch at the beginning of the very short measuring period and to open the switch at the end of this period. Such an operation involving a closing and opening in a very quick succession is extremely difficult and cannot be performed with the required precision owing to the inertia of the mechanical parts involved in the operation. As the grid circuits of the thyratrons, which grid circuits include the photodiodes, are prematurely energized by timing cam II, sufficient time is available for a transient readjustment of said grid circuits so that after the anode circuit has been closed by timing cam I the thyratrons will be fired immediately in response to an appropriate signal from a photodiode. The photodiodes used according to the invention have response times amounting only to fractions of a millisecond.

A thyratron must be fired by an exposure signal from a photodiode to detect tube sections which are too narrow and by a coverage signal from a photodiode to detect tube sections which are too wide. For this reason, two thyratrons are used according to the invention. This enables also the use of two solenoids, one of which serves for releasing a movable deflector in the case of a tube section which is too narrow and the other for releasing a deflector in the case of a tube section which is too wide.

In an embodiment of the invention, two further photodiodes may be provided for detecting tube sections which have an oblique orientation and these photodiodes may be connected in parallel to the photodiode for detecting the narrow tube sections and may precede the width-sensing photodiodes by one tube width. In this arrangement, the photodiodes replace the sensing rollers of a known device for detecting and rejecting tube sections having an oblique orientation, which sensing rollers cooperate with mating rollers to establish an electrical connection. The desired time and the operation of the timing cam are selected in accordance with the desired position of the leading edges of the tube sections. This desired position remains the same as to location and machine time phase during the processing of tube sections of all widths to be handled by the machine. In case of a change of the width of the tube sections, the photodiodes which sense the width of the tube are jointly adjusted to the new width.

As the photodiodes for detecting tube sections which are too narrow or which lag behind on the right or left or at both ends transmit an exposure signal and such signal would also be transmitted if a tube section were missing, as may be the case, an additional photodiode is arranged according to the invention in the intermediate area of the tube sections in sensing position and serves for detecting missing tube sections, an exposure of said additional photodiode preventing an operation of the movable deflector or deflectors because such operation would be superfluous in the case of a missing tube section. If the solenoid or solenoids are thyratron-controlled, a photodiode for detecting missing tube sections is used for this purpose and controls a second grid of that thyratron which is usually fired by exposure signals.

The photodiode which serves for detecting tube sections which are too wide and transmits a coverage signal is connected in the grid circuit of the associated second thyratron to a potential which is opposite to that of the photodiodes for detecting tube sections which are too narrow or have an oblique orientation, which latter photodiodes transmit exposure signals and are included in the grid circuit of the first thyratron. For this reason the switch which is operated by timing cam II cannot be used also for opening both grid circuits. To eliminate the need for a separate switch in the grid circuit of the second thyratron, this thyratron may also be provided according to the invention with two grids, the second grid being connected to the same potential as the first grid of the thyratron which is fired by exposure signals and which includes in its circuit the switch operated by the timing cam for de-energizing both photodiodes. Thus, the switch operated by timing cam II is effective in both grid circuits.

It will be particularly advantageous if, according to the copending U.S. patent application Ser. No. 496,366, filed Oct. 15, 1965, in the name of Gottfried Espel, each solenoid for the movable deflector or deflectors consists of an A.C. solenoid having an A.C. rating which corresponds approximately to the actual operating current value, which solenoid is D.C.-fed by a series resistor and shunted by a capacitor, and the switch for energizing and de-energizing the solenoid is connected between the solenoid and the capacitor. According to the copending U.S. patent application Ser. No. 496,367 filed Oct. 15, 1965, in the name of Karl-Heinz Haneke, the switch may preferably consist of a thyratron. This arrangement ensures that the solenoid will have the fast response which is required for an operation of the movable deflector in time even at high machine speeds and in the case of a short distance between the sensing point and the movable deflector.

As a thyratron may be overloaded for a short time, it may be used directly for energizing and de-energizing the solenoid which has been selected and connected according to the above-mentioned prior proposal. Owing to its overload capacity, the thyratron will not be damaged by the strong switch-on current surge which is produced by the capacitor and causes the rapid attraction of the solenoid. For this reason, the solenoid as well as the thyratron may be designed for the much lower steady-state current which flows when the solenoid has attracted so that a high circuit-closing power is obtained whereas large and expensive components are avoided.

The invention will be described more fully hereinafter with reference to the drawings, in which a sensing station of a machine according to the invention and the circuit according to the invention are diagrammatically shown.

Figure 4:
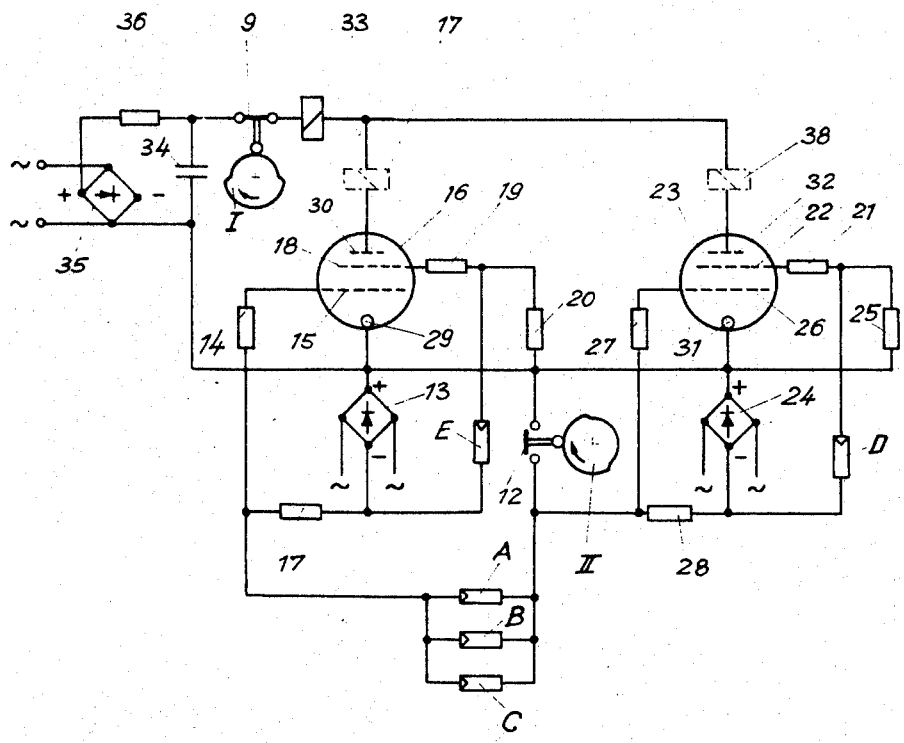

In the drawings,

FIG. 1 is a diagrammatic top plan view showing a succession of tube sections fed through the sensing station, FIG. 2 is a top plan view showing true to size, on a larger scale than in FIG. 1, a tube section in a first position in the sensing station, which tube section is broken away but for small portions, FIG. 3 shows the same tube section as in FIG. 2 in a second position in the sensing station, and FIG. 4 is a circuit diagram of the sensing device according to the invention.

Tube sections 1 to 5, which are shown partly broken away in FIG. 1, are moved in a transverse orientation in the direction of arrow 6 to the processing machine, which is not shown. The tube sections lie on conveyor belts, which are not shown either, and which feed the tube sections into engagement with stops 7 and 8. These stops are secured to chains, not shown, which move at a slightly lower speed. In this known manner the tube sections are normally exactly aligned by the engagement of their leading side edges with the stops so that the tube sections have exactly the desired relation to the machine and the further processing stations. The aligned tube sections move through a sensing station, which comprises five light barriers known per se and including photodiodes A, B, C, D and E.

The tube sections move through the sensing station, e.g., at a speed of 120 sections per minute. In this case the machine cycle per workpiece is only half a second. The machine is capable of processing wider and narrower tube sections. FIG. 1 shows tube sections which have the largest allowable width. With these tube sections, the spacing between the tube section is, e.g., only 20 mm. If the spacing between two successive stops 7, 8 is, e.g., 760 mm., the feeding speed in the case of 120 tube sections per minute is $760 \times 120/60 = 1520$ mm./sec.$=1.52$ meters per second. In this case the spacing of 20 mm. between two tube sections, which is obtained with the widest tube sections having a width of, e.g., 740 mm., is traversed in $20/1520 = 0.013$ second $= 13$ milliseconds.

The hatched rectangle I′ in the lower portion of FIG. 1 indicates the path portion which is traversed by the tube sections while timing cam I (FIG. 4) holds a switch 9 closed. In the showing of FIG. 1, the leading edge 10 of tube section 3 has just reached that point of the machine where it is disposed at the time when the switch 9 is being closed, provided that the leading edge is in the desired position, i.e., engages the stops 7, 8. The photodiodes A and B which sense the leading edge of the tube on the right and left of stops 7 and 8 are so disposed that the leading edge of the tube section moving between the photodiodes and the light sources covers the photodiodes to such an extent at this time that the photodiodes have just assumed their covered state. The photodiode D for sensing the trailing edge 11 of the tube section is so arranged that it is exposed by the trailing edge of the tube section at this time to such an extent that the photodiode has just assumed its exposed state.

The electrical parameters associated with a photodiode, and the light source, are so selected that the photodiode assumes its covered or exposed state when the photoelectric eye has been covered or exposed, e.g., by 60%. This has the advantage that the limiting line which must be traversed by the controlling edge of the tube section for generation of an exposure signal or a coverage signal lies in the intermediate region of the photoelectric eye and in this region the change of the covered or exposed area of the circular photoelectric eye is a maximum, for strictly geometric reasons, provided that the covering surface moves across the eye at a uniform velocity.

Thus, any tolerance as to the effective coverage signal or exposure signal results in the intermediate region of the photoelectric eye in smallest tolerances regarding the position of the edge of the covering or exposing surface in the direction of movement and consequently the greatest possible accuracy of the result of measurement.

In FIG. 1, the path portion I′ equals, e.g., one half of the distance between successive stops 7, 8. This means that timing cam I holds the switch 9 closed for half a cycle period. As the switching operations must be repeated for each workpiece, the timing cam performs one revolution in each machine cycle. As a result, switch 9 is opened during the remaining half of the machine cycle.

The hatched rectangle II′ in the lower portion of FIG. 1 represents the path portion which is traversed by the tube sections while a timing cam II (FIG. 4) holds a switch 12 closed. It is apparent from the showing in FIG. 1 that switch 12 is closed when the workpieces reach the sensing position and that it is not opened until timing cam I has closed switch 9 (see path I′ in FIG. 1) for a short time. The time when switch 12 is closed by timing cam II is so selected that the opening of switch 9 in the last cycle by timing cam I has already been effected so that there is no interference with the preceding sensing cycle.

Photodiode C is so arranged that it is still fully covered by tube section 3 in the position shown in FIG. 1.

Photodiode E is disposed in the intermediate portion of the sensing station, as is shown only in FIG. 1.

The function of photodiodes A, B and D will now be explained more fully with reference to FIG. 2. The tube section 3 is shown in FIG. 2 in the same position as in FIG. 1. The leading edge 10 of the tube engages the stops 7 and 8 and covers photodiodes A and B to such an extent that these photodiodes have just assumed their covered state. If the leading edge 10 does not engage stops 7 and 8 and has an oblique orientation, as is indicated by dash-dot lines 10′ or 10″, because the tube section has not been properly fed, and photodiode A or B is not covered to this extent in the illustrated condition when switch 9 is being closed by timing cam I (see the showing I′ in FIG. 2), or if the leading edge just lags behind its desired position without angular misalignment so that both photodiodes A and B are not covered to the above-mentioned extent, the current flow through these photodiodes will differ from that obtained under normal conditions. For this reason, photodiodes A and B can be utilized in a suitable circuit for releasing a movable deflector for rejecting workpieces which are not properly positioned.

With a properly positioned tube section, variations in its width, which extends in the feeding direction, will become apparent at its trailing edge and certain small variations may lie within an allowable tolerance range, within which such variations will not interfere with the operation of the processing machine. In FIGS. 2 and 3, two trailing edges $11_1$ and $11_2$ of tube sections are shown. These trailing edges are spaced apart by the allowable width tolerance. The narrowest tube sections to be expected terminate at dash-dot line $11_1′$. The widest tube sections to be expected terminate at dash-dot line $11_2′$. Photodiode D is so arranged that at the time when switch 9 is being closed by timing cam I the photodiode D has been exposed by the widest allowable tube section, i.e., by the trailing edge $11_2$ in FIG. 2, to such an extent that the photodiode has just assumed its exposed state. This condition is shown in FIG. 2. A wider tube section would cover the photodiode D to a larger extent at this time so that a different current would flow through the photodiode. This different current can be utilized in a suitable circuit for releasing a movable deflector for rejecting tube sections which are too wide.

FIG. 3 shows the tube sections 3 and 4 of FIG. 2 at a somewhat later time, when switch 12 (FIG. 4) is being opened by timing cam II, as is indicated at II′ in FIG. 3. Contrary to the showing in FIG. 2, the leading edge 10 of the tube section is now aligned with the forward edge of path portion II′.

Photodiode C is so arranged that when switch 12 is being opened by timing cam II the photodiode C is still sufficiently covered by the narrowest allowable tube section, i.e., by the trailing edge $11_1$, so that the photodiode is in its covered state. In the case of a tube section which is too narrow, the edge $11_1′$, e.g., would have exposed the photodiode C to such an extent that the photodiode is in its exposed state, a different current flows through this photodiode and can be used in a suitable circuit for releasing a movable deflector for rejecting tube sections which are too narrow.

The description which will be given hereinafter with reference to FIG. 4 of the circuit and the further elements of the sensing device will now be anticipated by the statement that none of the photodiodes can initiate a switching operation before switch 9 has been closed by timing cam I and after switch 12 has been opened by timing cam II, i.e., outside the area and time which is defined by the overlap of path portions I′ and II′. By this arrangement, e.g., by the action of timing cam I closing the switch 9, it is ensured, that photodiodes A and B cannot cause a release of the deflector and a rejection of a tube section lying in the desired position owing to the exposed state of these photodiodes until they have been covered to the required extent by the leading edge of the tube section which is in the desired position shown in FIG. 2, whereas these photodiodes become effective in an exposed state in the case of a tube section which is not properly positioned. It is further ensured by this arrangement that photodiode D cannot release the deflector and cause a rejection of a tube section of proper width owing to the covered state of said photodiode according to FIG. 2 until it has been exposed to the required extent by the trailing edge $11_2$ of the widest allowable tube section, whereas said photodiode becomes effective in a covered state in the case of a tube section which is too wide.

As both switches 9 and 12 must be closed for a release of a movable deflector, it is ensured that the exposed state assumed by the photodiode C immediately when it has been further exposed by the trailing edge $11_1$ of an allowably narrow tube section, as shown in FIG. 3, does not result in a release of a movable deflector and a rejection of a tube section of proper width when switch 12 has been opened by timing cam II whereas said photodiode will become effective in an exposed state in the case of a tube section which is too narrow. The opening of switch 12 ensures further that photodiode D, which becomes effective in a covered state, is cut off in time so that the covered state assumed by it owing to the immediately ensuing covering of said photodiode by the leading edge of the next tube section 4 cannot cause a release of the movable deflector because this must be avoided.

The latter condition determines the time at which switch 12 is opened by timing cam II. In the present embodiment switch 12 is opened by timing cam II, 7 milliseconds after the closing of switch 9 by timing cam I. This corresponds to an advance of 10.6 mm. With the minimum nominal spacing of 20 mm. between tube sections having the largest nominal width, as has been assumed here, the resulting safe spacing between the leading edge of the succeeding tube section and the line which must be traversed by the leading edge of the tube section to cause the photodiode D to assume its covered state amounts to 9.4 mm. and corresponds to a time of 13−7=6 milliseconds, 13 milliseconds being the time required to traverse 20 mm. when 120 workpieces are fed per minute and the spacing between the leading edges of successive workpieces is 760 mm. so that the feeding speed is 1520 mm. per second, as has been stated in the introductory part of the specification.

The position of photodiode C depends on this time, determined by photodiode D, when switch 12 is being opened by timing cam II.

Measurements have shown that a sensing accuracy to 1.5 mm. is ensured. This is entirely sufficient in the present case, where only a sensing accuracy of 3 mm. is required.

As the tube sections to be sensed consist preferably of plastics material, a known light barrier is used, in which the light source and the receiving photodiode are mounted on one side of the feed path and a known triplex mirror is disposed on the other side of this path. By this triplex mirror, light rays which fall on said mirror at an oblique or right angle thereto are reflected parallel to themselves so that the action of the mirror is independent of its position and mounting. It is known that normal mirrors cannot be mounted on machines in such a manner that the mirrors remain definitely in the desired position in which the reflected ray has always the same direction to the receiver. The light barrier which has just been described is referred to as a reflecting sensing device and has in the present case the special advantage that the light ray must pass through the tube sections of plastics material twice, on its forward and rearward path sections, and is thus attenuated twice, which results in a sufficient reduction in intensity so that even a transparent sheeting of plastics material causes a sufficient darkening of the photodiode.

In the circuit diagram of FIG. 4, photodiodes A to E are symbolized. Photodiodes which are exposed to light carry a larger current than photodiodes which are not exposed to light. The photodiodes A, B and C which initiate a switching operation in response to an exposure to light are connected in parallel. One terminal of each of these photodiodes is connected by switch 12 to the positive terminal of a rectifier 13. The other terminal of each of these photodiodes is connected by a protective resistor 14 to one grid 15 of a first thyratron 16. Grid 15 is connected by a working resistor 17 to the negative terminal of rectifier 13. When photodiodes A, B or C are not exposed to light, the negative potential predominates at grid 15 and the thyratron does not fire. As soon as one or more of photodiodes A, B or C are exposed, they carry a higher current so that the potential at the grid 15 goes more positive at least to such an extent that it is less than −2 volts. The thyratron will now fire if the negative potential at the second grid 18 of thyratron 16 is very small too. This will be the case when photodiode E, which in series with a protective resistor 19 connects grid 18 to the negative terminal of rectifier 13, is not exposed so that the current carried by this photodiode is so small that the voltage drop at the working resistor 20 is less than 2 volts. Thus, thyratron 16 will fire when one or more of photodiodes A to C are exposed and photodiode E remains covered at the same time. If photodiode E is also exposed, a negative potential will be applied to grid 18 and will prevent a firing of the thyratron in spite of the neutral potential at grid 15. Photodiode E will be exposed when a tube section is missing. In this case, photodiodes A to C will be exposed too so that the thyratron would fire. When a tube section is missing, however, an operation of a movable deflector is not necessary. For this reason, the firing of the thyratron is advantageously prevented in this case by photodiode E. In the case of a tube section which is improperly aligned or too narrow, the exposure of one or more of photodiodes A to C causes a firing of the thyratron because photodiode E is covered by a workpiece so that the zero potential at grid 18 is maintained. Such tube will be rejected, as will be explained more fully hereinafter.

Photodiode D in series with a protective resistor 21 connects one grid 22 of a second thyratron 23 to the negative terminal of a second rectifier 24. A working resistance 25 in series with the protective resistance 21 connects also the positive terminal of rectifier 24 to grid 22. Only when photodiode D is covered the current carried by it is reduced to such an extent that the voltage drop at resistor 25 is very small and the firing voltage is reached at grid 22.

Thus, thyratron 23 can fire when photodiode D is covered provided that the negative potential at the second grid 26 of this thyratron is very small too. This will be the case when switch 12 is closed because grid 26 is connected in series with the protective resistor 27 and switch 12 to the positive terminal of rectifier 24. When switch 12 is open, rectifier 24 applies the full cut-off voltage to grid 26 through the working resistor 28 and the protective resistor 27. As a result, photodiode D cannot effect a firing when switch 12 has been opened by timing cam II, nor can photodiodes A to C, which have been connected to the positive terminal of rectifier 13 by switch 12, as has been described hereinbefore.

The protective resistors 14, 19, 21 and 27 prevent an excessive current flow in the grid circuit of a fired thyratron. The working resistors 17, 20, 25 and 28 prevent the cut-off voltage supplied by rectifiers 13 and 24 from being short-circuited by the photodiodes (working resistors 17, 20 and 25) or directly by the switch 12 (working resistor 28).

The firing of either of the two thyratrons 16 and 23 closes a further circuit by a current flow from the cathode 29 to the anode 30 of thyratron 16 or from the cathode 31 to the anode 32 of thyratron 23. This firing does not only depend on the above-mentioned grid voltages but also on the closing of switch 9, which is included in the anode circuit, by timing cam I. When all requirements for the firing of one of the two thyratrons are fulfilled, a capacitor 34 will be discharged, which is included in the anode circuit and shunts a solenoid 33 so that the latter attracts immediately. According to the above-mentioned copending application Ser. No. 496,366, the solenoid consists of an A.C. solenoid, which is fed with direct current through a series resistor and has an A.C. rating which corresponds approximately to the actual operating current. The D.C. source consists in the present case of a rectifier 35, which after the discharge of capacitor 34 supplies solenoid 33 through a series resistor 36 with a current which is sufficient for holding the solenoid and is limited by the current rating of the solenoid. Between the switching operations, capacitor 34 is charged to the peak voltage of the alternating current supplied to the rectifier, e.g., to 300 volts in the case of a nominal A.C. voltage of 220 volts. This peak voltage causes an attracting current flow which is, e.g., ten times the rated current so that the solenoid attracts very quickly. (In this example the rated current flows at a voltage of only 30 volts.) The thyratron can also be overloaded for a short time to this extent.

When only a single movable deflector is provided for rejecting tube sections which are too wide and tube sections which are too narrow, only one solenoid 33 is employed. When it is desired to provide two movable deflectors, one for rejecting tube sections which are too narrow or improperly positioned and the other for rejecting tube sections which are too wide, the single solenoid 33 is replaced by two solenoids 37 and 38, each of which is connected in the anode circuit of one of the parallel thyratrons 16 and 23 so that each solenoid is energized only when the associated thyratron is fired.

The solenoids serve in known manner only for releasing the locked movable deflectors, which are then operated, e.g., by a camwheel which is driven by the processing machine. The fast switching operation is essential to ensure that the tube sections move only through a short distance from the sensing station to the movable deflector because this is desirable for a compact and inexpensive structure of the machine. The use of the thyratron for a direct switching of the solenoid results also in a saving of time compared to the previously usual contactors.

The attracting of an A.C. contactor may take up to 15 milliseconds. A thyratron performs its switching operation within some microseconds. If the distance travelled by the tube section from the sensing station to the time when the locked deflector is released is 100 mm., 65 milliseconds will be available if the throughput is 120 workpieces per minute and the pitch of the workpieces is 760 mm. An A.C. solenoid which is switched in the normal manner requires 17 milliseconds for attraction. The A.C. solenoid which is D.C. fed according to the above-mentioned application Ser. No. 496,366 attracts within 10 milliseconds. Whereas the switching time amounted previously to 15+17=32 milliseconds, it is reduced according to the invention to 10 milliseconds so that the overall length of the machine can be reduced or the speed can be increased. The response time of the photodiodes is negligibly small and amounts to only 0.1 millisecond.

The cam wheels I and II perform one revolution per workpiece and operate the switches 9 and 12 at the times which have been stated above in connection with FIGURES 1 to 3. Even though the photodiodes A and B have already been exposed between succeeding workpieces, and photodiode D has been covered by the tube section and switch 12 has been closed, the thyratrons cannot be fired until switch 9 in their anode circuit has been closed. The previous closing of switch 12 permits of a previous transient readjustment of the grid circuits. When switch 9 has been closed, both switches are closed and the workpiece is sensed by all five photodiodes within the short period of time which is available until switch 12 is opened. In the embodiment shown by way of example, this takes place 7 milliseconds after the closing of switch 9. As switch 12 is opened, photodiode C cannot fire the thyratron 16 although this photodiode is now exposed to light between successive workpieces. The fact that switch 12 is open prevents also an immediate firing of thyratron 23 although photodiode D is covered by the next following tube section immediately thereafter. This is enabled by the fact that switch 12 controls the grid 15 of thyratron 16 through photodiodes A to C and controls the grid 26 to thyratron 23 through the protective resistor 27. When switch 12 has been opened, switch 9 remains closed so that the anode circuit is maintained as is required for the operation of the solenoids for releasing the locked movable deflector or deflectors. This anode circuit is not affected by changes in the grid voltages when the thyratron has been fired. The opening of switch 9 takes place before the next closing of switch 12 and causes the thyratrons to extinguish so that the initial state is re-established.

What is claimed is:

1. A machine for manufacturing sacks having folded bottoms, which sacks are made from transversely fed tube sections, particularly of plastic material, characterized by means which precedes the bottom-laying station and serves for automatically rejecting any tube section which differs from the desired width by more than a predetermined, allowable tolerance, said means consisting of a photoelectrical sensing station, at least one movable deflector, and electromagnetic means controlled in response to said sensing station and serving to reject defective tube sections, and wherein stops are provided to be engaged by one of the longitudinal edges of the tube section, preferably the leading edge of the tube section moving in the feeding direction, and signals indicating the actual passage of the other longitudinal edge of the tube section are compared in the photoelectric sensing station with two signals representing the desired passage times for the two tolerance limits of the respective longitudinal edge of the tube section.

2. A machine according to claim 1, characterized in that it is adjustable to the handling of the tube sections having different widths.

3. A machine according to claim 2, characterized in that two movable deflectors are provided for tube sections which are too wide and too narrow, respectively.

4. A machine according to claim 1, characterized in that photodiodes are used for transmitting the signals indicating the actual passage, and timing cams are used for energizing or de-energizing the photodiodes at the time of the desired passage.

5. A machine according to claim 4, characterized in that a photodiode is provided for detecting tube sections which are too wide and a timing cam energizes the photodiode immediately after the desired passage time of the trailing edge of the widest tube section within the tolerance range and transmits a signal when this photodiode is covered.

6. A machine according to claim 4, characterized in that a photodiode is provided for detecting tube sections which are too narrow and a timing cam de-energizes the photodiode immediately before the desired passage time of the trailing edge of the narrowest tube section within the tolerance range and transmits a signal when exposed to light.

7. A machine according to claim 4, characterized in that two photodiodes are arranged in the feeding direction spaced to exceed the spacing of the tolerance limits, and two timing cams in succession generate the signals indicating the desired passage times.

8. A machine according to claim 7, characterized in that the sensing points for tube sections which are too wide and tube sections which are too narrow are disposed so that, with allowance being made for tolerance limits, the photodiode for detecting tube sections which are too narrow is de-energized after the photodiode for detecting tube sections which are too wide is energized.

9. A machine according to claim 8, characterized in that the photodiodes and timing cams are arranged in such a circuit that both photodiodes are de-energized at the same time by one and the same timing cam.

10. A machine according to claim 9, characterized in that the timing cam which does not serve for de-energizing the photodiodes serves for de-energizing the electromagnetic means which controls the movable deflector.

11. A machine according to claim 10, characterized in that a thyratron adapted to be fired by the respective photodiode is provided for energizing the electromagnetic means and switch means operated by the timing cam as well as the electromagnetic means is included in the anode circuit of the thyratrons.

12. A machine according to claim 11, characterized in that the switch which is operated by the timing cam for de-energizing both photodiodes is included in the grid circuit of the thyratrons.

13. A machine according to claim 12, characterized in that the closing of the switch which is operated by the timing cam for de-energizing both photodiodes precedes the closing of the switch which is operated by the other timing cam, but only for such a period of time that the other timing cam has already opened the anode circuit.

14. A machine according to claim 1, characterized in that two further photodiodes are provided for detecting tube sections which have an oblique orientation and that these photodiodes are connected in parallel to the photodiode for detecting the narrow tube sections.

15. A machine according to claim 1, characterized by an additional photodiode, which is arranged in the intermediate area of the tube sections in sensing position and serves for detecting missing tube sections, an exposure of said additional photodiode preventing an operation of the movable deflector.

16. A machine according to claim 15, in which a thyratron controls the electromagnetic means and the photodiode for detecting missing tube sections controls a second grid of the thyratron which is normally fired by exposure signals.

17. A machine according to claim 1, comprising two thyratrons normally fired by an exposure signal and a coverage signal, respectively, characterized in that the thyratron fired by coverage signals is provided with two grids, the second grid being connected to the same potential as the first grid of the thyratron which is fired by exposure signals, a timing cam for de-energizing both photodiodes, and a switch operated by the timing cam connected in the circuit of the thyratron.

18. A machine according to claim 1, characterized in that the electromagnetic means for the movable deflector consists of a circuit including an A.C. solenoid having an A.C. rating which corresponds approximately to the actual operating current value, a series resistor, a shunt capacitor, and a switch for energizing and de-energizing the solenoid connected between the solenoid and the capacitor, said solenoid being D.C. fed.

19. A machine according to claim 1, characterized in that the electrical parameters associated with the photoelectrical sensing station are so selected that the photoelectric device is actuated when about one half exposed.

20. A machine according to claim 1, characterized in that the photoelectrical sensing station includes light sources and associated photoelectric devices arranged on one side of the feeding path and respective triplex mirrors arranged on the other side.

21. A machine according to claim 1, characterized in that the electromagnetic means serves only for releasing the normally locked movable deflector, and a camwheel which is driven by the machine then operates the unlocked deflector.

References Cited

UNITED STATES PATENTS

| | | | |
|---|---|---|---|
| 2,338,088 | 1/1944 | Bleichfeld | 209—82 |
| 2,998,881 | 9/1961 | Quinn et al. | 209—82 |
| 3,002,283 | 10/1961 | Quinn et al. | 209—82 X |
| 3,021,950 | 2/1962 | Quinn et al. | 209—82 |

ALLEN N. KNOWLES, *Primary Examiner.*